United States Patent

[11] 3,616,364

[72] Inventor Gaetano F. D'Alelio
 South Bend, Ind.
[21] Appl. No. 814,430
[22] Filed Apr. 8, 1969
[45] Patented Oct. 26, 1971
[73] Assignee PPG Industries, Inc.
 Pittsburgh, Pa.
 Continuation of application Ser. No.
 581,688, Sept. 26, 1966.

[54] PROCESS OF TREATING RADIATION-SENSITIVE POLYMERS
 10 Claims, No Drawings

[52] U.S. Cl. .................................................. 204/159.14,
 117/93.3, 117/138.8, 117/161, 156/327, 156/334,
 204/159.12, 204/159.15, 204/159.16, 204/159.22,
 204/159.23, 260/17, 260/17.4, 260/22, 260/47,
 260/77.5, 260/78.4, 260/78.5, 260/80.72,
 260/80.75, 260/80.81, 260/83.5, 260/86,
 260/86.7, 260/85.9, 260/87.3, 260/89.9, 260/90

[51] Int. Cl. ..................................................... B01j 1/10,
 C08f 1/24
[50] Field of Search ..................................... 204/159.14;
 260/88.3, 86.1, 85.5, 86.7, 78.4

[56] References Cited
UNITED STATES PATENTS

| | | | |
|---|---|---|---|
| 3,448,089 | 6/1969 | Celeste .......................... | 260/78.5 |
| 3,418,295 | 12/1968 | Schoenthaler ................ | 260/80.72 |
| 3,224,989 | 12/1965 | Nevin .......................... | 260/89.5 |
| 3,043,820 | 7/1962 | Krieble ........................ | 260/89.5 |

*Primary Examiner*—Murray Tillman
*Assistant Examiner*—Richard B. Turer
*Attorney*—Chisholm & Spencer ABSTRACT: The preparation of highly radiation-sensitive cross-linkable polymers whereby said polymers are treated by subjecting same to high-energy ionizing irradiation so as to produce three-dimensional cross-linked, insoluble, infusible polymers at relatively low doses of ionizing irradiation.

PROCESS OF TREATING RADIATION-SENSITIVE POLYMERS

This application is a continuation of our copending application, Ser. No. 581,688, filed Sept. 26, 1966.

This invention relates to cross-linkable polymers. More specifically it relates to cross-linkable polymers having activated vinyl or vinylidene pendant groups extending from the linear polymer chain. Particularly it relates to a specific type of polymer having acrylic or methacrylic radicals extending as branches from a linear polymer molecule. Still more particularly it relates to polymers especially suited to cross-linking in view of the highly radiation-sensitive groups therein. The polymers of this invention are readily cross-linked by radical, anionic and cationic initiators and effectively also by irradiation.

Many monomers as well as polymers have been subjected to ionizing radiation to convert them to improved or modified products. However, irradiation processes have been primarily of scientific interest, and very little use of such irradiation polymer processes has been made industrially. This is primarily due to economic factors because of the cost of the ionizing radiation delivered to the system to be treated. For example, the well-known low-cost polyester systems, which consist of a mixture of about equal parts by weight of styrene monomer and unsaturated alkyd resin prepared from maleic or fumaric anhydride, phthalic anhydride, and ethylene glycol or diethylene glycol, can in most cases, be more economically polymerized by free radical initiators than by ionizing radiation which require 110 or more megarads, depending on the formulation.

Such systems can be improved, however, by the elimination or reduction of phthalic anhydride in the formulation of the polyester and substituting more expensive monomeric acrylic compounds for the styrene. Even in such systems, the economic factors are unfavorable not only because of the much higher cost of the mixture but because of the high volatility of the acrylic or methacrylic monomeric compounds used. Even in such cases, the irradiation dose required is uneconomical, and the systems are highly inhibited by oxygen. The addition of substances such as acetone or methyl ethyl ketone can reduce the required irradiation dose. Even then, the products possess the undesirable odor of unpolymerized acrylic monomer unless high dosages are used.

Consequently, it is desirable to develop polymeric compositions which can be readily converted to cross-linked, insoluble, infusible polymers by exposure to ionizing radiation in doses of less than 10 megarads, preferably less than 5 megarads. Radiation does in this range are economical for commercial use.

It has now been found that cross-linking of various polymeric compositions can be effected with economical radiation doses by the use of various polymers of this invention. Furthermore, such radiation-sensitive polymers and various modifications thereof can be used for a number of other purposes.

The polymers of this invention have a plurality of repeating units in the linear chain thereof having the formula

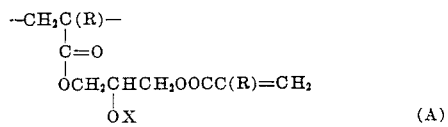

(A)

wherein R is hydrogen, or a methyl, chloro- or cyanoradical;
X is hydrogen, an acyl radical or a urethane radical, preferably when the polymeric composition is to be exposed to radiation the acyl and urethane radicals are aliphatic.

In these polymers there are at least 2, preferably at least 5, of said repeating units. In the formulas given hereinafter the number of such repeating units is indicated by n, which has a value of at least 2, preferably at least 5.

The acyl radical can have a carboxylic radical attached thereto, and the urethane radical can have an isocyanate group attached. Consequently the acyl radical can be represented as

wherein R' is a hydrocarbon radical, i.e., aliphatic, including cycloaliphatic, and aromatic, and a hydrocarbon radical having a carboxylic acid group attached, and the urethane radical can be represented as

wherein R'' is a hydrocarbon radical as above and also a hydrocarbon radical having an isocyanate group attached thereto. Each of the hydrocarbon radicals referred to above advantageously has no more than 24 carbon atoms.

When the polymeric compositions of this invention are to be cross-linked by the application of radiation, since aromatic nuclei act as energy sinks, it is advantageous, if economical, to have no aromatic or only a very minor amount of aromatic nuclei therein. For purposes other than radiation, the polymers of this invention can have aromatic nuclei therein and can be cross-linked by chemical means or can be used as cross-linking agents or modifiers for other polymers having substantial amounts of aromatic nuclei. As pointed out more fully hereinafter, the polymers of this invention have various other uses and advantages per se, or in modifying other polymers.

The polymers of this invention are prepared by the reaction of acrylic acid or methacrylic acid or anhydrides thereof with a polymer having at least 1 molar percent in the linear chain thereof of a repeating unit having the formula

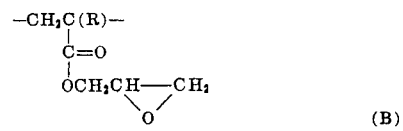

(B)

wherein R is as defined above. There are at least two such repeating units per polymer molecule. Preferably the polymer has at least 5 molar percent of said repeating units and optimally 10–25 percent. While polymers having as high as 100 molar percent can be used, there is no particular added advantage in these higher percentages which are economically less desirable.

This reaction can be represented as follows using the homopolymer for illustrative purpose:

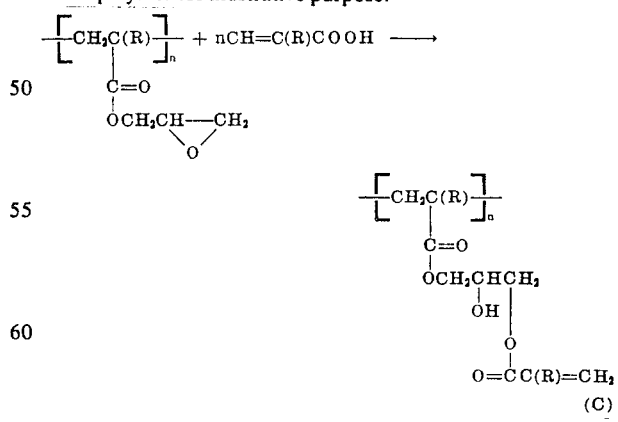

(C)

Although the pendant acryloxy group in the repeating unit is shown attached to the terminal carbon atom of the glycidyl group upon opening of the oxirane ring, and it is believed that the structure is predominantly of this type, it is considered equivalent to have the resultant arrangement as

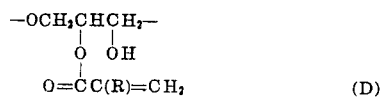

(D)

The product may actually consist of a mixture of such structures. However, for purpose of simplicity the formulas show the acryloxy group in the terminal position and it is intended to embrace both structures.

In the above polymer formulas the terminal portions are not indicated but these can be represented by K attached to the free terminal valencies, as shown in some formulas hereinafter. At least one of these K's is a fragment of the radical generating catalyst with which the starting polymer was initiated. The other K can represent another such fragment when polymer termination is caused by coupling of two polymer chains. Otherwise, when disproportionation occurs in the termination the other K is an olefinic unit from the staring monomer.

The glycidyl polymers used in the above reaction can be prepared by the vinyl polymerization of the glycidyl acrylate type monomer, by means of radical initiators such as the peroxy and azo catalysts. Of the azo-type catalyst, azobisisobutyronitrile is especially preferred. If peroxide catalysts are used in such polymerizations, they are advantageously of the aliphatic types such as stearyl or lauroyl peroxide, etc. However, benzoyl peroxide, tertiary butyl peroxide and other well-known peroxy catalysts such as tertiary butyl peracetate can also be used.

Where a glycidyl acrylate homopolymer is desired, this can be obtained readily by polymerization in a suitable organic solvent such as ethyl acetate. Preferred, however, are the ketones such as methyl ethyl ketone, methyl isobutyl ketone, acetone, etc., as solvents. In such cases, a solution of 25–60 percent of the monomer in the ketone is used.

For copolymerizations in which there is a major part of a comonomer, other solvents such as toluene, benzene, tetrahydrofuran, etc., can be used as the medium for the polymerization. With azo-type catalysts, the polymerization temperature is advantageously about 75–80° C., the molecular weight depending on the amount of catalyst used. For lower molecular weight polymers, 3 percent of an azo catalyst such as azobisisobutyronitrile, etc., is used, and for higher molecular weight polymers or copolymers, 1 percent or 0.1 percent of the azo catalyst can be used.

In the reaction wherein the acrylic acid, including the indicated substituted acrylic acids, is condensed with the oxirane ring of the polyglycidyl acrylate, it is desirable sometimes to use an inert gas atmosphere such as nitrogen or helium. While the acidity of the acrylic acid is generally sufficient to catalyze the opening of the oxirane ring this reaction proceeds slowly and it is generally desirable to catalyze this with an acid such as an aromatic sulfonic acid, e.g., toluene sulfonic acid, benzene sulfonic acid, naphthalene sulfonic acid, chlorobenzenesulfonic acid, diphenylsulfonic acid, etc.

While premature polymerization may not be sufficient in some cases to require an inhibitor it is generally desirable when a sulfonic acid is used to also have present, in order to prevent premature polymerization of the derived polymer of acrylic or other unsaturated groups, a small amount of an inhibitor, such as tertiary-butyl catechol, ditertiary butyl paracresol, hydroquinone, resorcinol or other di- or polyhydroxyphenols; phenolic resins, aromatic amines such as p,p'-phenylenediamine, 1,5-diaminonaphthalene, etc., pyrogallol, tannic acid, ascorbic acid, benzaldehyde, α-naphthol, sulfur compounds, etc., or other well-known inhibitors for this purpose. Such etc., or inhibitors are generally used in an amount of at least 0.1 percent preferably at least 0.5 percent by weight.

Furthermore, while reference is made in most cases to the addition with acrylic acid, it is understood that the same reactions can be performed with chloracrylic, cyanoacrylic and methacrylic acids, as indicated by the R-substituent group in the above formulas, and using similar conditions. Generally about the equivalent amount or slight excess of that amount of the acid should be used as desired to be reacted with the oxirane rings, in any case at least one molar percent per molecule.

In the opening of the oxirane ring by the reaction with acrylic acid, a free hydroxyl group is simultaneously generated. The presence of this hydroxyl group has certain advantages in the resultant properties.

Where it is desired to modify the properties of the resultant polymer, it is possible to react this hydroxyl group with various acylating agents or isocyanate reagents to produce an acyl or urethane derivative as represented by the Y radical of the above formula. For example, the hydroxy group can be modified by the addition of any saturated or unsaturated acyl radical including the various acrylic radicals already attached by the splitting of the oxirane ring. Where it is desirable to improve the bonding or the adhesive character of the polymer, such as the glass, metal, wood, stone, etc., it is advantageous to modify this hydroxy group by reaction with succinic, adipic, maleic, phthalic or other anhydride so that the resultant ester group has a pendant carboxylic radical for improving adhesion.

In addition to the above-described method of preparation applicant's copending application, Ser. No. 581,687, filed the same date herewith discloses and claims another process for preparing similar polymers starting with a linear polymer having pendant carboxylic acid groups, as derived by polymerization or copolymerization of acrylic acid, and reacting such acid groups with glycidyl acrylate.

As previously indicated, when the polymers of this invention are to be used as cross-linking modifiers for compositions eventually to be treated with radiation, it is desirable that the polymers of this invention, as well as the polymers to which they are added as modifiers, contain no aromatic nuclei or only limited amounts thereof. Larger proportions of such nuclei can be tolerated but as the proportions of aromatic nuclei in the respective polymers are increased, the radiation dosages required to effect cross-linking increases accordingly apparently due to the fact that aromatic ring compounds are energy sinks for irradiation. If instead of an acrylic acid I react a unsaturated fatty acids with the polymers containing the oxirane group, I obtain the corresponding unsaturated fatty acid derivative and a new class of polymers is obtained which do not contain an acrylic ester group. These unsaturated fatty acids may contain from 16 to 24 carbon atoms and possess at least one and no more than four—$CH=CH$— groups and a terminal—$CH_3$ group, as for example linoleic, linolenic and oleic, etc., acids. These new esters on exposure to oxygen, oxygen containing gases, or other forms of free or liberated oxygen, become converted to the insoluble, infusible state, at room or higher temperatures. This conversion is readily accelerated by the addition of catalytic quantities of metal salts, known in the coating arts as driers. The free hydroxyl group resulting from this esterification reaction can be esterified with more unsaturated fatty acid or converted to the appropriate derivatives by reaction with monocarboxylic acids, dicarboxylic acid anhydrides, mono- or diisocyanates, etc.

The term "irradiation," as used herein, means high energy radiation and-or the secondary energies resulting from the conversion of this electron or other particle energy to neutron or gamma radiation, said energies being at least equivalent to about 10,000 volts. While various types of irradiation are suitable for this purpose, such as X-ray and gamma and beta rays, the radiation produced by accelerated high-energy electrons has been found to be very conveniently and economically applicable and to give very satisfactory results. However, regardless of the type of irradiation and the type of equipment used for its generation or application, the use thereof in the practice of the invention as described herein is contemplated as falling within the scope of this invention so long as the ionization radiation is equivalent to about 10,000 electron volts.

While there is no upper limit to the electron energy that can be so applied advantageously, the effects desired in the practice of this invention can be accomplished without having to go above about 20,000,000 electron volts (20 mev.). Generally, the higher the electron energy used, the greater is the depth of penetration into the massive structure of the materials to be treated, and the shorter is the time of exposure required to accomplish the desired result. For other types of irradiation, such as gamma and X-rays energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha particles, deuterons, beta particles, or their analogs, directed in such a way that the particle is projected into the mass to be irradiated. Charged particles can be accelerated by the aid of voltage gradients by such devices as accelerators with resonance chambers, Van der Graaff generators, insulating core transformers, betatrons, synchrotons, cyclotrons, etc. Neutron radiation can be produced by bombarding a selected light metal such as beryllium with positive particles of high energy. Particle radiations can also be obtained by the use of an atomic pile, radioactive isotropes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 10,000 electron volts. In addition to radiations of this type, commonly called X-ray, an ionizing electromagnetic radiation suitable for the practice of this invention can be obtained by means of a nuclear reactor (pile) or by the use of natural or synthetic radioactive material, for example, Cobalt 60.

Various types of high power electron accelerators are commercially available, for example, the ARCO and Varian type travelling wave linear accelerators, operating at 3–45 million electron volts and sometimes higher, accelerators such as supplied by High Voltage Engineering Corporation, Burlington, Massachusetts, Radiation Dynamics Incorporated, Long Island, New York, and Texas Nuclear Corporation, Austin, Texas. Further, the type of accelerators as described in U.S. Pat. No. 2,763,609 and in British Pat. No. 762,953 are satisfactory for the practice of this invention.

There is a limit to the speed of which a radiation initiated polymerization can proceed. I have experimentally proven that it takes 0.3 of a second after the radiation initiation step for all of the remaining reaction steps to terminate. For example, assume it takes a dose 4 megarad to cure a polymer system, there is no efficiency gain if the radiation is delivered in less than 0.3 of a second.

Further, I have discovered that the surface hardness of the cured polymer system is a function of the dose rate at which the radiation is absorbed into the polymer. Good results are obtained when the dose rate is above 5 megarad per second.

In the following examples, the radiation doses are reported in megarads, which represent 1,000,000 rads. A "rad" is defined as the unit of absorbed dose and is equal to 100 ergs per gram.

In view of the fact that radiation dosage previously required to effect a practical degree of cross-linking in most polymers was sufficiently high so as to be uneconomical and in many cases it was accompanied by degradation of the polymer, it is particularly important that blending with the polymers of this invention permits cross-linking of such polymers to be effected at lower radiation dosages, as described more fully hereinafter. The polymers of this invention have a particular utility for modifying various types of resins for subsequent radiation, such as polyesters, both saturated and unsaturated, including maleic-ethylene glycol, phthalic-ethylene glycol, polyvinyl acetate, polyethylene terephthalate, methyl methacrylate, etc., polyvinyl chloride, polyamides, such as nylon and polycaprolactamide, etc.

As the starting polymer, glycidyl acrylate can be copolymerized with other vinyl monomers such as the acrylic and methacrylic esters such as the methyl, ethyl, propyl, butyl, hexyl, cyclohexyl, dodecyl, etc. esters. In addition to, or in lieu of these acrylic type esters used in copolymerization with the glycidyl acrylate to prepare the staring polymer, any other copolymerizable monovinyl or monovinylidene comonomer or mixtures thereof can be used, for example, the vinyl esters, that is vinylacetate, and the monovinyl esters of saturated and unsaturated, aliphatic, monobasic and polybasic acids, and more specifically the vinyl esters of the following acids: propionic, isobutyric, valeric, caprylic, caproic, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc. esters of the aforementioned acids, acrylonitrile, methacrylonitrile, methacrylic acid, hydroxy propyl methacrylate, etc.; itaconic acid monoesters and diesters, such as the methyl, ethyl, butyl esters, the maleic and fumaric acid monoesters, diesters and their amid and nitrile compounds, such as diethyl maleate, maleyl diamide, fumaryl dinitrile, dimethyl fumarate, etc.; ethers, such as methallyl ethyl ether, vinyl ethyl ether, vinyl butyl ether, allyl propyl ether, vinyl butyl ether; cyanuric acid derivatives having one copolymerizable unsaturated group attached directly or indirectly to the triazine ring, such as allyl diethyl cyanurate, vinyl diethyl cyanurate, as well as the partial, soluble or fusible polymerizable polymers of the hereinabove listed monomers, etc.

The above aliphatic comonomers are preferred where the products are to be radiated. However, limited amounts, usually less than the molar equivalent of one or more of the above dialiphatic monomers, can be used without too large an increase in the required radiation dosage with the following aromatic comonomers. When used alone, larger radiation dosages are required. Where no radiation is to be used these aromatic monomers can be used by themselves or in combination with the aliphatic type. Typical suitable aromatic comonomers include vinyl aryl compounds such as styrene, vinyl naphthalene, vinyl toluene, vinyl xylene, vinyl phenol, vinyl ethyl benzene, vinyl dimethyl naphthalene, vinyl diphenyl, etc., vinyl phenyl ether, vinyl benzoate, vinyl naphthoate, vinyl methyl phthalate, allyl ethyl phthalate, allyl propyl phthalate, etc.

Typical monobasic acids that can be used for providing the acyl groups to be attached to the hydroxy group as described above are illustrated by the following: formic, acetic, propionic, butyric, acrylic, methacrylic, oleic, stearic acid, etc., or their anhydrides. Aromatic monobasic acids that can be used where appropriate include: benzoic, phenylacetic, naphthoic, etc.

Typical dibasic acids that can be used, particularly in the anhydride from if available, for esterifying the resultant hydroxy group upon splitting of the oxirane ring, have the formula: HOOC—R''—COOH wherein R'' is a divalent hydrocarbon radical, preferably aliphatic in character when the resultant products are to be radiated. Preferred aliphatic dibasic acids are oxalic, malonic, succinic, adipic, glutaric, sebacic, 2-methyl succinic, pimelic, 2,3-dimethyl succinic, suberic, hexyl succinic, 1,2-hexahydrophthalic, 1,3-hexahydrophthalic, 1,4-hexahydrophthalic, azelaic, 1,1-cyclobutanedicarboxylic, trans-1,4-cyclohexandicarboxylic, 3,3-diethyl glutaric, 3,3-dimethyl glutaric, 2,2-dimethyl glutaric, 2,2-dimethyl succinic, 2-keto-glutaric, diglycollic, maleic, fumaric, citraconic, messaconic, acetylene dicarboxylic, aconotic, cyclohexene dicarboxylic, etc., itaconic and its homologues, as, for instance, alpha-methylitaconic acid, alpha, alpha-dimethyl-itaconic acid, etc.

Aromatic dibasic acids that can be used when the products are not to be radiated, or in very limited amounts when the products are to be radiated and the accompanying increase in required radiation dosage is not considered objectionable are illustrated by the following: phthalic, xylyl dicarboxylic, naphthalene dicarboxylic, alpha-phenyl succinic acid, etc.

Such dibasic acids or their anhydrides are to be used in such proportions that only one carboxylic group will be esterified leaving the other free to impart adhesive or other desirable characteristics.

Typical examples of various isocyanate and diisocyanate compounds that can be reacted with the free hydroxy group as described above to produce various urethane derivatives include but are not restricted to the following: butyl isocyanate, octyl isocyanate, octadecyl isocyanate, phenyl isocyanate, benzyl isocyanate, naphthyl isocyanate, cyclohexyl isocyanate, cyclohexylethyl isocyanate, hexamethylene diisocyanate, tetramehylene diisocyanate, cyclohexylene diisocyanate, 4,4'-dicyclo-hexylmethane diisocyanate, 2,4-toluylene, diisocyanate, 2,6-toluylene diisocyanate, p-phenylene diisocyanate, 4,4'-diphenylmethane diisocyanate, 1,5-napthylene diisocyanate, dibenzidene diisocyanate, benzidene diisocyanate, 4,4'-diphenyl diisocyanate, etc.

As discussed above with respect to the acids, used for acylation, aliphatic isocyanates are advantageously used where the products are eventually to be radiated. As with the dibasic acids, sufficient amount of a diisocyanate is to be used so that only one of the isocyanate groups reacts and the other is left free for subsequent reaction.

A few illustrative examples of suitable polymers which may be modified by or mixed with the cross-linkable polymers of this invention for subsequent radiation treatment are the nonaromatic type polymers such as polyvinylacetamide, polyacrylamide, polymethylacrylamide, polyhexamethylene, adipamide, polyethylene adipamide, polyethylene azelamide, polyethylenediacrylamide, polyvinyl acetate, polyethyl acrylate, polymethyl methacrylate, cellulose acetate, cellulose butyrate, ethyl cellulose, polyethylene adipate, polyethylene azeleate, polydecamethylene succinate, polydecamethylene sebacate, etc. The polymers of this invention are also compatible with polyvinyl chloride, particularly upon the application of moderate heat.

Aromatic polymers that can be used particularly where the mixture is to be cross-linked by radical generating catalysts, include but are not limited to ethylene glycol-maleate-phthalate, ethylene glycol-phthalate, diallyl phthalate, divinyl phthalte, polyvinyl aryls, such as polystyrene, polyvinylnaphthalene, polyvinyl toluene, polyvinylbenzoate, polyvinylphenyl ether, polyvinylphenol, etc.

The polymeric compositions of this invention are particularly useful as coating compositions on all types of substrates, including cellulose in its various forms, such as paper, wood, paperboard, woodboard, woodpulp, regenerated cellulose in film or fiber form, laminates of various types including those prepared from fibrous fillers bonded with urea, melamine, epoxy and polyester resins, plasterboard, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers in the absence of presence of dyes, pigments, plasticizers. For coating, impregnating or adhesive compositions where the presence of small amounts of solvent in the cured composition is not objectionable they can be mixed with volatile or nonvolatile solvents best suited to the particular application.

The polymers of this invention are useful in the preparation of copolymers with unsaturated alkyd resins. In carrying this portion of the invention into effect, an esterification product of a polyhydric alcohol and an alpha, alpha-unsaturated polycarboxylic acid is first prepared in accordance with techniques now well known to those skilled in the alkyd resin art.

Any aliphatic polyhydric alcohol containing at least two esterifiable aliphatic hydroxy groups, or mixtures of such alcohols, can be used in preparing the unsaturated alkyd resins. Examples of such polyhydric alcohols are ethylene glycol, di-, tri-, and tetraethylene glycols, thiodiglycol, glycerine, pentaerythritol, 1,4-dihydroxy-butene-2, dimethylol cyclohexane, dihydrocyclohexane, etc. For compositions to be eventually radiated, any nonaromatic, alpha, beta-polycarboxylic acid, or mixtures of such acids, can be reacted with the polyhydric alcohol or alcohols to form the unsaturated alkyd resin. Examples of such polycarboxylic acids are maleic, fumaric, citraconic, messaconic, acetylene dicarboxylic, aconitic, cyclohexene, dicarboxylic, etc., itaconic and its homologues, as, for instance, alpha-methyl itaconic acid, alpha-alpha-dimethyl itaconic acid, etc. Anhydrides of these polycarboxylic acids can also be employed.

In some cases, instead of using an unmodified, unsaturated alkyd resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc.

The esterification products of polyhydric alcohols with ethylenic polycarboxylic acids, or with aliphatic polycarboxylic acids, can be further modified by introducing as a reactant in the preparation of the alkyd resin, a monoesterifiable compound or compounds, more particularly a saturated or unsaturated normal or isomeric monohydric alcohol, or mixture thereof, a saturated or unsaturated monocarboxylic acid, or mixture thereof, or both such esterifiable monohydroxy organic compounds as well as by the use of hydroxyacids.

Examples of monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, cyclohexyl, cyclopentyl, etc. The use of methyl and ethyl alcohol is not precluded, but in general these alcohols are less satisfactory because of their lower boiling points. As monobasic acids there can be used, for example, the unsubstituted saturated and unsaturated normal or isomeric monocarboxylic acids containing only one esterifiable group, such as acetic, propionic, butyric, to stearic, inclusive, hexahydrotoluic, acrylic, methacrylic, furoic acids, etc.

The monoesterifiable compounds can be introduced into the esterification before, during, or after the esterification of the polyhydric alcohol with the polycarboxylic acid under conditions that promote interesterification of the monoesterifiable compound with the incompletely esterified polyhydric alcohol-polycarboxylic acid product. This is, the monoesterifiable compound is introduced into the reaction mass before all of the acid groups of the polyhydric acid, or all of the alcohol groups of the polyhydric alcohol have been esterified.

The term "unsaturated nonaromatic alkyd resins," as used generally herein is intended to include within its meaning both unmodified esterification products of a nonaromatic polyhydric alcohol with a nonaromatic alpha-unsaturated, alpha, beta-polycarboxylic acid and esterification products of these components which have been modified, for example, as briefly described hereinabove. An alternate term is "unsaturated aliphatic alkyd resins" (including cycloaliphatic types).

To achieve copolymerization of the unsaturated alkyd resin with the cross-linkable polymers of this invention, a solution or mixture of the unsaturated alkyd resin in the cross-linkable polymer is first effected. Copolymerization of the components of the mixture is achieved readily by the addition of radical generating catalysts, and rapidly and advantageously by ionizing radiation, such as by atomic radiation from a reactor, or from Cobalt 60, or by means of high-energy electrons generated by an electron linear accelerator.

Typical examples of unsaturated alkyd resins are:

Alkyd Resin A

Ethylene Glycol Itaconate

|  | Parts (by weight) |
|---|---|
| Ethylene glycol | 23 |
| Itaconic acid | 52 |

The components are mixed and slowly heated in the course of one hour from room temperature to 190° C., in an inert nitrogen atmosphere, and held at this temperature for 3 to 5 hours.

Alkyd Resin B

Ethylene Glycol Maleate

| | Parts (by weight) |
|---|---|
| Ethylene glycol | 31 |
| Maleic anhydride | 32 |

The compounds are mixed and heated as in the preparation of alkyd resin A to 190° C., and held at that temperature for four to 6 hours.

Alkyd Resin C

Acetic Acid-modified Diethylene Glycol Maleate

| | Parts (by weight) |
|---|---|
| Diethylene glycol | 108 |
| Maleic anhydride | 88 |
| Acetic anhydride | 10 |

The ingredients are mixed together and refluxed for 1 hour in an inert atmosphere of nitrogen after which the reaction mixture is brought to 190° C., which temperature is maintained for 4 to 6 hours.

It will be understood, of course, that this invention is not limited to the use of the specific unsaturated alkyd resins mentioned above and that a broad modification of the nature of the copolymer is possible by using other unsaturated aliphatic alkyd resins or mixture of such resins. As illustrative examples of other unsaturated alkyd resins, the following esterification products can be used, as illustrated in alkyd resins D to I. Aromatic alkyd resin J is included for comparison.

| Alkyd resin | Components (parts) |
|---|---|
| D | Diethylene glycol (160). Maleic anhydride (147). |
| E | Diethylene glycol (106). Itaconic acid (130). |
| F | Glycerine (18.4). Itaconic acid (39.0). |
| G | Ethylene glycol (610). Maleic anhydride (196.6). Hydroxypropyl acrylate (26.0). |
| H | Ethylene glycol (20). Maleic anhydride (29.4). Succinic acid (3.3). |
| I | Diethylene glycol (30.6). Maleic anhydride (17.6). Itaconic acid (15.6). |
| J | Diethylene glycol (30.3). Maleic anhydride (13.2). Phthalic anhydride (21.7). |

In many cases, instead of copolymerizing a single polymer of this invention with a single alkyd resin, mixture can be used of two or more such polymers with a single alkyd resin, or a single such polymer with two or more alkyd resins, or a mixture of two or more such polymers with two or more resins.

The modified resins of this invention can be used alone or with fillers, dyes, pigments, opacifiers, lubricants, plasticizers, natural and synthetic resins or other modifying bodies in, for example, casting, molding, laminating, coating applications, and as adhesives, impregnants, and protective coatings.

In coating, impregnating and similar applications, the mixed monomeric or partially copolymerized materials, without added solvent can be applied to the object to be treated and polymerized, with or without the application of heat and pressure, to form the final, insoluble polymeric composition in situ. These new synthetic materials can be used as impregnants for many porous bodies, such as cork, pottery, felts, or fabricated bodies with interstices, such as the windings of electrical coils, netted fibers, interwoven cotton or glass materials, etc. They can also be used for the production of wire coatings, and winding tapes, and for protectively coating impervious articles, such as metals, or for coating and impregnating articles such as paper, wood cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one polymer of this invention and at least one other aliphatic resin, with or without modifying agents, can be cast under pressure while being irradiated.

In preparing the interpolymerization products of the cross-linkable polymer of this invention and the modifying polymer, the cross-linkable polymer of this invention can constitute as much as 98 to 99 percent by weight of the whole. In other cases the modifying polymer, alone or admixed with comonomers or modifiers can constitute as much as 98 to 99 percent by weight of the whole.

In general, the proportions of the components used in a particular formulation will depend upon the particular properties desired in the interpolymer. For most applications, it is preferred to use 20 to 80 percent of the cross-linkable polymer of this invention and from 80 to 20 percent of the modifying polymer or monomer, since within these ranges interpolymers best adapted for most commercial applications can be produced.

Within these ranges the new interpolymers have a wide range of properties. For example, depending upon the particular cross-linking polymer and any modifying polymer or monomer, the particular proportions thereof, the conditions of polymerization, such as the temperature, pressure, presence or absence of additives, etc., the irradiation dose, and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or nonvolatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acids, bases, salts, solvents, swelling agents, and the like.

When it is desired to modify the properties of the cross-linkable polymers of this invention, this can be accomplished by copolymerizing a mixture comprising at least one such polymer with at least one copolymerizable monomer containing at least one unsaturated ethylenic, or acetylenic hydrocarbon radical, more particularly, a

radical, such as vinyl, allyl, methallyl, vinylidene, etc., or with a copolymerizable compound containing a —CH=CH—, or a

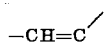

, or a

grouping, for example as in vinylidene fluoride, vinylidene cyanide, vinyl propionate, maleic anhydride, or its esters and amides, methyl maleic anhydride, tetrafluorethylene, etc.

Additional examples of copolymerizable comonomers are monomeric or partially polymerized vinyl esters, such as the acetate, propionate, etc., vinyl ketones, methyl vinyl ketones, olefinic nitriles, such as acrylonitrile, methacrylonitrile, fumaryl nitrile, beta-cyano-ethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc., itaconic esters, for example, dimethyl itaconate, diethyl itaconate, diallyl itaconate; olefinic amides, for example, acrylamide, itaconamide, the maleic mono- and diamides, and the corresponding imides, etc., the vinyl ethers, for example, vinyl butyl ether, vinyl isobutyl ether, vinyl cyclohexyl ether, the dienes, etc., for example, butadiene, isoprene, dimethyl butadiene, etc., styrene, the o-, m- and p-styrenes, etc.

In preparing copolymers of the cross-linkable polymers with polymerizable comonomers such as methyl methacrylate, styrene, acrylonitrile, and the like, the cross-linkable polymer can constitute as little as 0.1 percent by weight of the whole, whereas in other cases the cross-linkable polymers can constitute as much as 98 to 99 percent of the whole. The proportion of the components in a particular formulation will depend upon the particular comonomers used and the particular properties desired in the copolymer. The polymers and copolymers can be prepared most readily by ionizing radiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

EXAMPLE I a. In suitable apparatus equipped with a stirrer, reflux condenser, an inert gas inlet, heating mantle and thermostatic control, are placed 45 parts of glycidyl acrylate and 55 parts of methyl ethyl ketone. The apparatus is first swept with nitrogen and a nitrogen atmosphere is maintained above the reaction mass. To the above solution is added 0.5 part of azo isobutyronitrile, and the temperature raised to and maintained at 75°–80 C. for a period of 2 hours, and a clear, viscous solution of homopolymer in quantitative yield is obtained which has the repeating structure,

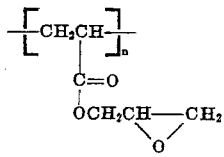

Ia b. To the above product is added 26 parts of acrylic acid, and after reaction at about 75° C. for 0.5 hour, this gives the cross-linkable polymer having the repeating structure,

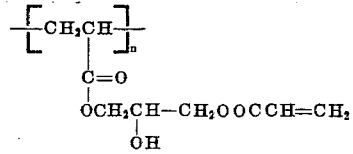

Ib c. Samples of product Ib are reacted with various reagents in proportions equivalent to the number of hydroxy groups in each sample used. With acetic anhydride, the resultant polymer has the repeating structure,

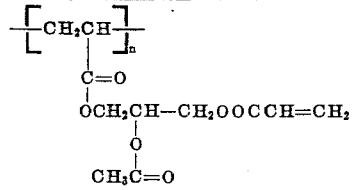

Ic d. When the reagent is acrylic anhydride, the resultant polymer product has the repeating structure,

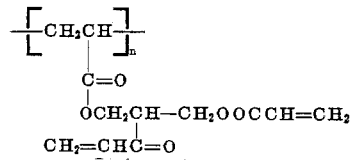

Id e. When the reagent is succinic anhydride, the resultant polymer product has the structure,

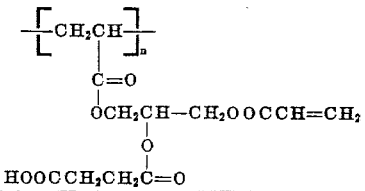

Ie f. When the reagent is maleic anhydride, the resultant polymer product has the repeating structure,

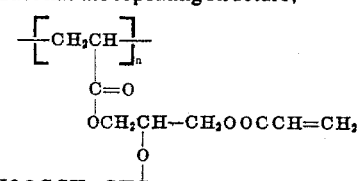

If g. When the reagent is hexamethylene diisocyanate, the resultant polymer product has the repeating structure,

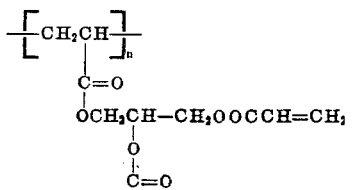

Ig h. When the reagent is a monoisocyanate, RNCO, i.e., $C_4H_9NCO$ or $H_3CC_6H_4NCO$, the resultant polymer product has the repeating structure,

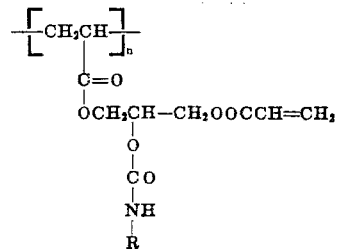

Ih i. When the procedure of I(b) is repeated using an equivalent amount of methacrylic acid in place of the acrylic acid, the resultant polymer product has the repeating structure,

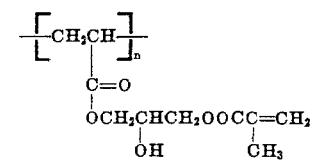

Ii and when the hydroxy groups of this product are reacted with the various reagents as in I(c) through I(f) the corresponding derivatives are obtained.

The polymers of example I(a) through I(i) are recovered from their solutions by distillation of the solvent at reduced pressures, but preferably by precipitation by adding the ketone solution to hexane or heptane. The addition of benzoyl peroxide, 0.5 weight percent based on polymer, to the ketone solution yields a solution of polymers I(a) to I(i) which when cast as films yield cross-linked, infusible polymers upon heating for one hour at 100° C.

EXAMPLE II

The procedure of example I(a) is repeated a number of times using instead of glycidyl acrylate, the corresponding glycidyl acrylates; (a) the methacrylate, (a') the α-chloro acrylate and (a'') the α-cyano acrylate, and the resultant homopolymers have the following repeating units respectively:

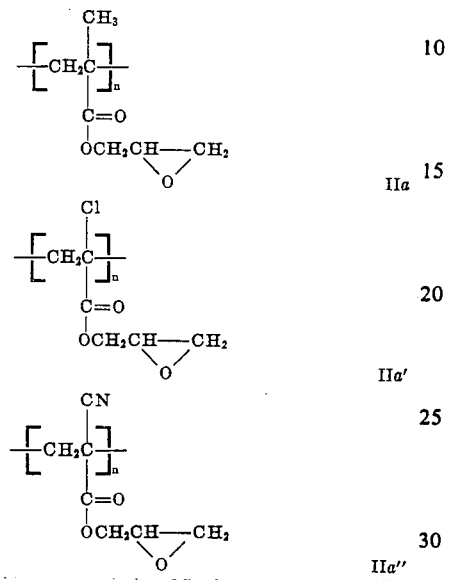

IIa

IIa'

IIa''

When the subsequent reactions are performed as in I(b) through I(i) the procedure in example I, the corresponding derivatives are obtained as in example I, except that the repeating unit in each case has the constituent as shown in the above repeating unit formulas IIa, IIa and IIa.

Solutions of these polymers containing 0.1 to 1.0 percent benzoyl peroxide tertiary butyl perbenzoate, or cumene hydroperoxide, yield, after casting, insoluble, infusible films upon heating at 130° C. for 15 minutes.

EXAMPLE III

The procedure of example I is repeated a number of times using various proportions of glycidyl acrylate, and methyl methacrylate as indicated in the table below using in each case 127 parts of methyl ethyl ketone as solvent.

| Parts of methyl methacrylate | Parts of glycidyl acrylate | Molar percent of glycidyl acrylate on monomer portion |
|---|---|---|
| 95 | 6.4 | 5 |
| 75 | 32 | 25 |
| 50 | 64 | 50 |
| 25 | 96 | 75 |
| 5 | 121.6 | 95 |

In the various solutions the weight percent of monomer mixture in the solution is in the range of approximately 44–55 percent. The resultant copolymers are represented by the following formula in which the value of n and the value of m for the respective repeating units will vary according to the molar percent of the corresponding monomers used in the reaction mixture. Moreover while the repeating units are shown grouped in the respective brackets of the formula, these repeating units can be intermingled at random throughout the linear copolymer.

$$K-\left[CH_2CH\right]_n\left[CH_2C\right]_m-K$$
$$\qquad C=O \qquad COOCH_3$$
$$\qquad OCH_2CH-CH_2$$
$$\qquad\qquad\quad O$$

IIIa where K is as defined above.

(b) When this product is reacted with acrylic acid as in example Ib it is converted to the following structure:

$$K-\left[CH_2CH\right]_n\left[CH_2C(CH_3)\right]_m-K$$
$$\quad C=O \qquad\quad COOCH_3$$
$$\quad OCH_2CH-CH_2$$
$$\qquad\quad OH \quad O$$
$$\qquad\qquad O=CCH=CH_2$$

IIIb (c–f) When the IIIb product is subsequently reacted with anhydrides as in example Ic through If and with the diisocyanate as in example Ig the corresponding products are obtained in which the hydroxy group has been converted to give products having the following formulas respectively:

IIIc

IIId

IIIe

IIIf

IIIg

EXAMPLE IV

The procedure of example I is repeated using the monomeric mixture of 30 mole percent glycidyl acrylate, 35 mole percent styrene and 35 mole percent methyl methacrylate. The resultant tripolymer has the structure:

$$-\left[CH_2CH\right]_n\left[CH_2C(CH_3)\right]_m\left[CH_2CH\right]_x$$
$$\quad C=O \qquad\quad C=O \qquad\quad C_6H_5$$
$$\quad O \qquad\qquad OCH_3$$
$$\quad CH_2CH-CH_2$$
$$\qquad\quad O$$

IV

Again as indicated above, the number of repeating units indicated by n, m and x corresponds to the mole percent of the corresponding monomer used. Likewise the various repeating units indicated within the brackets are distributed at random throughout the polymer length and they are not in the form of block copolymers.

When this tripolymer is treated with the various acylating agents and the diisocyanate used in example II, the corresponding acylated and urethane derivatives are obtained having the corresponding repeating units shown in example II.

EXAMPLE V

The procedure of example I, II and III are repeated using instead of the glycidyl acrylate, glycidyl alpha-chloracrylate, glycidyl alpha-methylacrylate and glycidyl alpha-cyano-acrylate respectively. In each case the homopolymer or copolymer obtained corresponds to that obtained with the glycidyl acrylate except that the repeating unit derived from the acrylate has the respective alpha-substituents thereon.

EXAMPLE VI

The procedures of examples II, III and IV are repeated using in place of the methyl methacrylate, equivalent amounts of methyl acrylate and ethyl acrylate respectively. In each case similar results are obtained except that the repeating units derived from the acrylate varies according to the differences in structure from the starting monomer as compared to the original methyl methacrylate.

EXAMPLE VII

The procedure of example II is repeated five times using in each case 30 mole percent of glycidyl acrylate and 70 mole percent of vinyl acetate, acrylonitrile, vinyl chloride, dimethylacrylamide and styrene respectively as comonomers. Similar results are obtained as in example II, except that the structure of the repeating unit derived from the comonomer varies according to the structure of the respective comonomers.

EXAMPLE VIII

The procedures of examples I-VII respectively are repeated. In each case the resultant methyl ethyl ketone solution of each polymer product is poured into twice the volume of methanol to precipitate the dissolved polymer as a powder. Six samples of these precipitated polymers are dissolved in various monomers to give 10 percent solutions in methyl methacrylate, styrene, acrylic acid, diethylaminoacrylate, vinyl acetate and ethyl acrylate. The respective solutions are polymerized using 1 percent benzoyl peroxide at a temperature of 60°–90° C., depending upon the specific monomer. The respective copolymers are found to have excellent adherence to metals, glass, stone, marble, concrete, wood, etc.

EXAMPLE IX

Films are prepared from the various methyl ethyl ketone solutions derived in examples I-VII by applying the respective solutions to a surface and allowing the methyl ethyl ketone to evaporate. The desired thickness of film is obtained by repeated applications of solutions on the same surface. These films are exposed to the beam of a 1 Mev. Van der Graaff accelerator. In each case, except with the samples containing styrene from example IV and VII, the sample becomes completely cross-linked and insoluble and infusible at radiation dosages of less than 4 megarads. Apparently because of the aromatic nuclei in the styrene-containing samples, these samples require 8–10 megarads for effecting sufficient cross-linking to produce the insolubility and infusibility.

EXAMPLE X

The procedure of example IX is repeated a number of times, except that prior to laying of the respective films, a solid polymer is added to the solution in such an amount as to give a ratio of 1 part of cross-linkable polymer to 3 parts of added polymer, with additional methyl ethyl ketone being added where necessary. The respective polymers added are: polymethyl-methacrylate, polyvinyl acetate, polyvinyl chloride, polyacrylamide, polyvinyl acetamide, polyhexamethylene, adipamide and cellulose acetate. In each case, the film is converted to an insoluble, infusible film on treatment with no more than 4 megarads of radiation.

EXAMPLE XI

The procedure of example X is repeated a number of times, except that the respective solutions are modified by the addition of 1 percent, based on the polymer content, of benzoyl peroxide, and instead of radiation treatment, the solution is cast into films and heat cured at 130° C. for 30 minutes, yielding solvent-resistant films. Similar results are obtained when other solvents are substituted for the methyl ethyl ketone, other peroxy catalysts are substituted for the benzoyl peroxide, or azo catalysts such as isobutyronitrile are substituted for the peroxy catalysts.

EXAMPLE XII

Twenty parts of the cross-linkable polymer of example IIIb is thoroughly and uniformly mixed as a melt with 80 parts of Alkyd Resin A. This is subjected to a radiation dose of 4.5 megarads and produces an insoluble, infusible hard product. Upon repetition, the heat resistance is improved still further with larger amounts of the cross-linkable polymer, and various fillers such as wood flour, alpha cellulose, asbestos, paper, cloth, etc., can be coated or impregnated with the mixture and hardened by radiation to give formed articles of good appearance and excellent properties.

Similar results are obtained when the other cross-linkable polymers of example III are used respectively with alkyd resin B—I. When alkyd resin J, which contains aromatic nuclei is a radiation dose of 8 megarads is required to effect a corresponding degree of cross-linking.

Where reference is made herein to molar percent of repeating units in the polymer structure, this is intended to mean molar percent based on the proportion of the specific monomer from which the particular repeating unit is derived as compared to the total monomer composition used to form the polymer. Another way of phrasing this is to state that there are a particular number of the particular repeating units per 100 repeating units of the polymer structure. For example, reference to 5 molar percent of a repeating unit can also be indicated by stating that in the polymer structure there are 5 of said repeating units per each 100 repeating units in the polymer.

Various peroxy type of catalysts and also various azo-type catalysts can be used for effecting polymerization and copolymerization of the cross-linkable polymers of this invention. The temperatures suitable for such polymerization are those generally used for the particular catalysts being used, e.g. generally in the range of about 50° C., preferably about 80° C. to 140° C., depending upon the particular catalyst. Also the appropriate temperature will depend on the presence of any solvent whose boiling point might offer a limitation if the polymerization is conducted in an open system. Generally a blanket of an inert gas is maintained over the polymerization mass to prevent discoloration.

Typical azo catalysts that can be used in preparing the starting polymers of this invention include and are not limited to the following: azo-bisisobutylronitrile; 2,2'-azo-bis-2-ethyl-butyronitrile, alpha,alpha'-azodiisobutyramide, and various other well known azo catalysts such as disclosed in U.S. Pat. No. 2,471,959 and No. 2,492,763.

Free radical generating catalysts of the peroxy type that can be used in polymerizing or copolymerizing the cross-linkable polymers of this invention include but are not restricted to the following: benzoyl peroxide, naphthyl peroxide, phthallyl peroxide tertiary-butyl-hydroperoxide, hydrogen peroxide, cyclohexyl hydroperoxide, tertiary-butyl-perbenzoate, cumene hydroperoxide, etc., persulfates, such as ammonium persulfate, potassium persulfate, persulfuric acid, etc., potassium perphosphate, etc.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

I claim:

1. A process for producing a cross-linked insoluble polymer comprising the treatment of a highly radiation sensitive polymer having the formula $$-CH_2C(R)-$$
$$\phantom{-CH_2}|$$
$$\phantom{-CH_2}C=O$$
$$\phantom{-CH_2}|$$
$$\phantom{-CH_2}OCH_2CHCH_2OOCC(R)=CH_2$$
$$\phantom{-CH_2OCH_2CHCH_2OO}|$$
$$\phantom{-CH_2OCH_2CHCH_2OO}OX$$

where R is a radical selected from the class consisting of hydrogen, methyl, chloro and cyano; and
X is a radical selected from the class consisting of acyl and urethane, said acyl radical having the formula $$\begin{array}{c}O\\\|\\-C-R'\end{array}$$

wherein R' is a radical selected from the class consisting of hydrocarbon and the hydrocarbon radical having a carboxylic acid group attached thereto, and said urethane radical having the formula $$\begin{array}{c}O\\\|\\-OCNH-R''\end{array}$$

wherein R'' is a radical selected from the class consisting of hydrocarbon and a hydrocarbon radical having an -NCO group attached thereto; there being at least two said repeating units per polymer molecule and there being at least two of said repeating units per each 100 repeating units therein with at least about 0.5 megarad and no more than about 10 megarads of high energy ionizing irradiation equivalent to at least 100,000 electron volts.

2. The process of claim 1 in which the proportion of said repeating units in said polymer represents approximately 10 to 25 molar percent of the total number of repeating units in said polymer.

3. The process of claim 1 in which the polymer contains in addition to said repeating units at least 5 molar percent of the repeating unit having the formula $$-CH_2-C(CH_3)-$$
$$\phantom{-CH_2-}|$$
$$\phantom{-CH_2-}COOCH_3$$

4. The process of claim 1 wherein said R and X groups are predominantly aliphatic.

5. The process of preparing a cross-linked polymer comprising the step of reacting a staring polymer having a plurality of repeating units therein having the formula $$-CH_2C(R)-$$
$$\phantom{-CH_2}|$$
$$\phantom{-CH_2}C=O$$
$$\phantom{-CH_2}|$$
$$\phantom{-CH_2}OCH_2CH\!\!-\!\!\!-\!\!\!-CH_2$$
$$\phantom{-CH_2OCH_2CHxxx}\backslash\ /$$
$$\phantom{-CH_2OCH_2CHxxxx}O$$

wherein R is a radical selected from the class consisting of hydrogen, methyl, chloro and cyano, with an acid having the formula $$CH_2=C(R)COOH$$

wherein R is as defined above, said acid being used in an amount of at least two molar equivalents per polymer molecule and being reacted at a temperature in the range of 20°–120° C. and said starting polymer having at least one of said repeating units per each 100 repeating units therein and subjecting said polymer to at least about 0.5 megarad and no more than about 10 megarads of high energy ionizing irradiation equivalent to at least 100,000 electron volts.

6. The process of claim 5 in which said staring polymer has at least 5 of said repeating units per 100 repeating units of said polymer and at least 5 molar equivalents of said acid per polymer of molecule.

7. The process of claim 5 in which said temperature is in the range of 60° to 120° C.

8. The process of claim 7 in which said reaction is catalyzed by the addition of at least 0.1 percent by weight of an aromatic sulfonic acid.

9. The process of claim 8 in which said reaction is conducted in the presence of at least 0.1 percent by weight of a polymerization inhibitor.

10. The process of claim 5 wherein a vinyl monomer is copolymerized with the starting polymer.

* * * * *

UNITED STATES PATENT OFFICE
CERTIFICATE OF CORRECTION

Patent No. 3,616,364        Dated October 26, 1971

Inventor(s) Gaetano F. D'Alelio

It is certified that error appears in the above-identified patent and that said Letters Patent are hereby corrected as shown below:

Claim 5, column 18, line 13, Please change "staring" to --starting--.

Claim 6, column 18, line 38, Please change "staring" to --starting--.

Signed and sealed this 18th day of July 1972.

(SEAL)
Attest:

EDWARD M. FLETCHER, JR.          ROBERT GOTTSCHALK
Attesting Officer                Commissioner of Patents